US010244885B2

(12) United States Patent
Barber

(10) Patent No.: US 10,244,885 B2
(45) Date of Patent: Apr. 2, 2019

(54) SYSTEMS AND METHODS FOR A REUSABLE BEVERAGE FUNNEL FILTER

(71) Applicant: Michael Barber, Round Rock, TX (US)

(72) Inventor: Michael Barber, Round Rock, TX (US)

( * ) Notice: Subject to any disclaimer, the term of this patent is extended or adjusted under 35 U.S.C. 154(b) by 39 days.

(21) Appl. No.: 15/270,281

(22) Filed: Sep. 20, 2016

(65) Prior Publication Data
US 2017/0119198 A1    May 4, 2017

Related U.S. Application Data

(60) Provisional application No. 62/250,247, filed on Nov. 3, 2015.

(51) Int. Cl.
*A47J 31/06* (2006.01)
*A47J 31/40* (2006.01)

(52) U.S. Cl.
CPC ......... *A47J 31/0642* (2013.01); *A47J 31/407* (2013.01)

(58) Field of Classification Search
CPC .. A47J 31/0626; A47J 31/0642; A47J 31/407; A23F 5/262; A23F 3/18; A23F 3/14; A23F 3/30; A23F 5/14; A23F 5/243; A23F 5/267; A23F 5/36; A23F 5/40
USPC ......... 99/279, 285, 295, 299, 300, 304, 305, 99/306, 323, 317, 302 R, 307, 323.3, 275, 99/316, 281, 283, 287, 322, 280, 282, 99/284, 286, 288, 289 R, 292, 293, 99/302 C, 303, 321, 644
See application file for complete search history.

(56) References Cited

U.S. PATENT DOCUMENTS

| | | | |
|---|---|---|---|
| 1,876,474 A | 9/1932 | Stabkey | |
| 3,917,305 A | 11/1975 | Di Chirico | |
| 3,986,780 A * | 10/1976 | Nivet | F16B 21/02 403/252 |
| 4,416,158 A | 11/1983 | Takimoto | |
| 5,249,509 A * | 10/1993 | English | A47J 31/0621 99/285 |
| 5,325,765 A * | 7/1994 | Sylvan | A47J 31/0673 426/433 |
| 5,775,206 A | 7/1998 | St-Gelais | |
| 5,840,189 A * | 11/1998 | Sylvan | B65D 85/8043 210/474 |
| 6,318,244 B1 * | 11/2001 | Justus | A47J 31/0615 99/279 |
| 2002/0078831 A1 * | 6/2002 | Cai | A47J 31/14 99/295 |
| 2005/0172818 A1 * | 8/2005 | Hunt | A47J 31/38 99/279 |
| 2012/0285334 A1 * | 11/2012 | DeMiglio | A47J 31/0689 99/300 |
| 2013/0017303 A1 * | 1/2013 | Vu | B65D 85/8043 426/433 |

(Continued)

FOREIGN PATENT DOCUMENTS

CA          2902043 A1 *  9/2014 .......... A47J 31/0605
WO  PCT/US2002/011077      10/2002

*Primary Examiner* — Ibrahime A Abraham
*Assistant Examiner* — Chris Q Liu
(74) *Attorney, Agent, or Firm* — Pierson IP, PLLC

(57) ABSTRACT

Examples of the present disclosure are related to systems and methods for a funnel and a removable cartridge holder that are used with a reusable beverage filter or beverage brewing pod.

12 Claims, 11 Drawing Sheets

(56) References Cited

U.S. PATENT DOCUMENTS

| | | | |
|---|---|---|---|
| 2013/0340626 A1* | 12/2013 | Oh | B65D 85/8043 99/295 |
| 2014/0182458 A1* | 7/2014 | Fernandez | A47J 31/547 99/295 |
| 2014/0287116 A1 | 9/2014 | Mack | |
| 2015/0327713 A1 | 11/2015 | Pruitt | |

* cited by examiner

SYSTEMS AND METHODS FOR A REUSABLE BEVERAGE FUNNEL FILTER

CROSS-REFERENCE TO RELATED APPLICATIONS

This application claims a benefit of priority under 35 U.S.C. § 119 to U.S. Provisional Patent Application No. 62/250,247 filed Nov. 3, 2015, which is hereby fully incorporated herein by reference in its entirety.

BACKGROUND INFORMATION

Field of the Disclosure

Examples of the present disclosure are related to systems and methods for a funnel and a removable cartridge holder that are used with a reusable beverage filter or coffee/beverage brewing pod.

Background

Single-serve coffee (beverage brewing) systems are created to prepare only enough coffee or beverage for a single portion. Single-serve coffee systems can reduce both the time needed to brew hot beverages while simplifying the brewing process by eliminating several steps. Conventional single-serve coffee systems may include coffee pods or packets that include pre-packaged ground coffee beans in their own filter, coffee capsules with plastic or aluminum packaging to be used within a single—proprietary machine and are thus not interchangeable, or coffee bags modeled after tea bags.

However, there is a high monetary and environmental cost associated with creating and disposing individual coffee pods, packets, or bags. This is because for each serving a new coffee pod, brewing pod, packet, or bag must be created, which creates a lot of waste. Alternatively, there is a high monetary cost associated with having to purchase a specialized brewing machine to utilize coffee capsules.

Accordingly, needs exist for more effective and efficient systems and methods for a funnel connected with a removable cartridge holder and a reusable beverage filter or pod that can be used in a conventional coffee maker to make a single cup of coffee.

SUMMARY

Embodiments disclosed herein describe systems and methods for a beverage system that utilizes a funnel to create elevated gravitational pressure to create predetermined amounts of brewed liquid, which may be used within a conventional coffee maker. Additionally, embodiments may be utilized as standalone device.

Embodiments of a beverage system may include a funnel, a cartridge holder, and a filter.

The funnel may be a tube with conical sidewalls and a flow separator. The conical sidewalls may be sloped such that an upper portion of the funnel has a wider diameter than a lower portion of the funnel. Utilizing the conical sidewalls, the funnel may be configured to channel liquid or other substances into the flow separator. The flow separator may be positioned below a lower surface of the funnel, and be configured to output liquid directed by the conical sidewalls. The flow separator may include a first outlet and four fins. The multiple fins are configured to prevent flow vortexes within the funnel, cartridge holder, and/or filter, which may reduce brewing efficiency.

The cartridge holder may be a device that is configured to be coupled with a lower surface of the funnel. The cartridge holder may also be configured to receive a filter and/or a brewing pod. An upper surface of the cartridge holder may include threads, grooves and/or projections that are configured to be received by threads, depressions and/or channels positioned on the lower surface of the funnel.

A lower surface of the cartridge holder may include a support structure that is configured to secure the beverage system in an upright position. In embodiments, the support structure may have an oblong shape. A width of the support structure may be shorter than a diameter of the upper surface of the cartridge holder, and a length of the support structure may be longer than the diameter of the upper surface of the cartridge holder. A lower surface of the support structure may include a tack and a second outlet. The tack may be configured to create an orifice within a brewing pod. Brewed liquid may be configured exit the cartridge holder from the second outlet.

The filter may be a device that is configured to hold ground coffee, tea, or other substances, receive water from the first outlet, and filter the ground coffee from the brewed liquid. In embodiments, the filter may include a screen or mesh that allows liquid to enter to be brewed and exit the filter, while retaining the ground coffee. In embodiments, the filter may be a brewing pod or a cup with an open top surface configured to sit within the cartridge holder.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
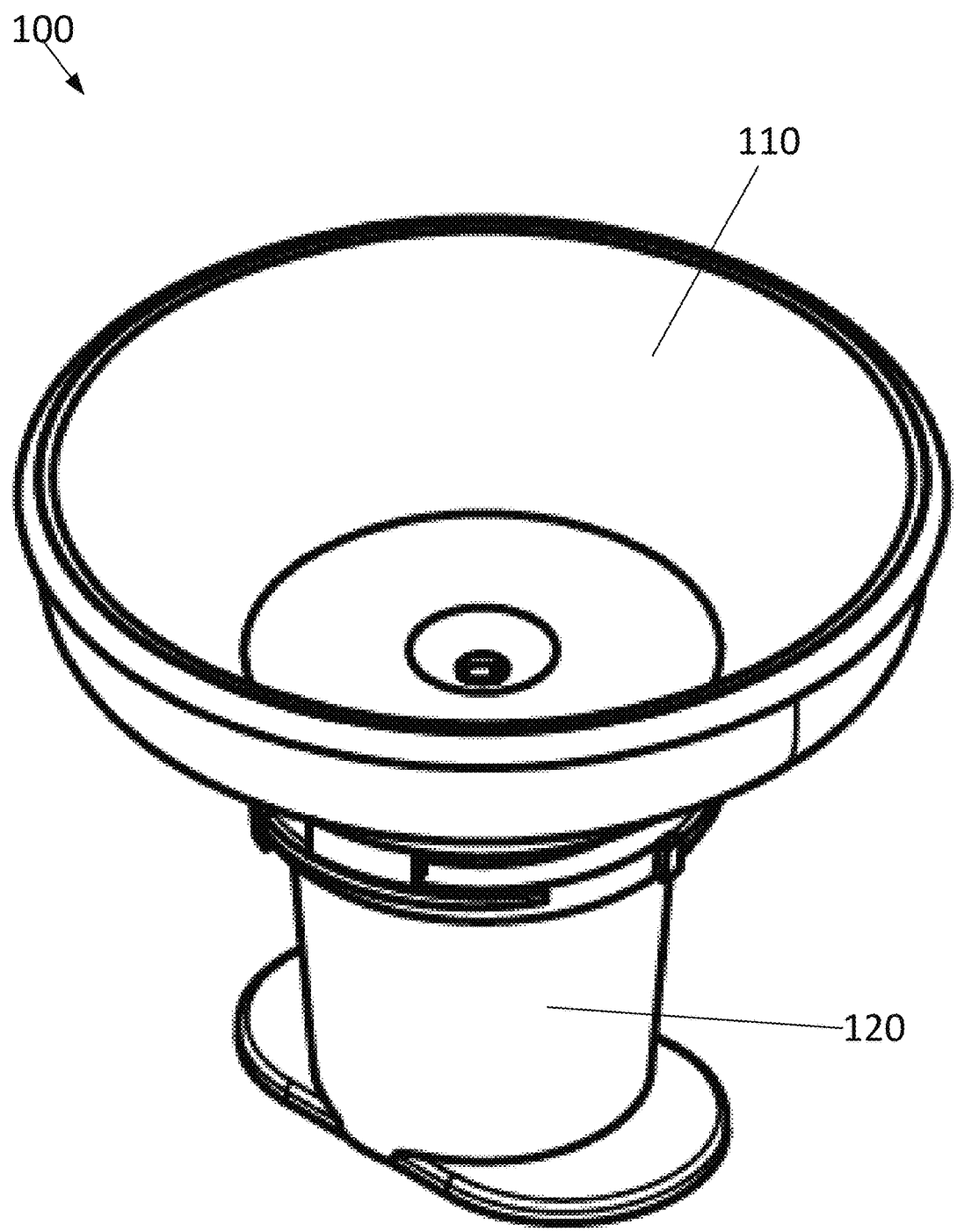
FIG. 1 depicts a brewing system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts one embodiment of a brewing system 100. System 100 may be configured to allow a user to make a predetermined amount of liquid, such as a single cup of coffee via a reusable filter.

Embodiments of system 100 may be configured to operate within a conventional coffee maker or independently with a source of water. While using conventional coffee maker, system 100 may be configured to be placed within a filter basket of the conventional coffee maker, such that system 100 does not require buying a new coffee maker to produce a single cup of coffee. One skilled in the art may appreciate that the sizing and dimensions of system 100 may be modified to make desired predetermined amount of brewed liquid.

System 100 may include a funnel 110, a cartridge holder 120, a support structure (not shown), and a filter (not shown).

Figure 2:
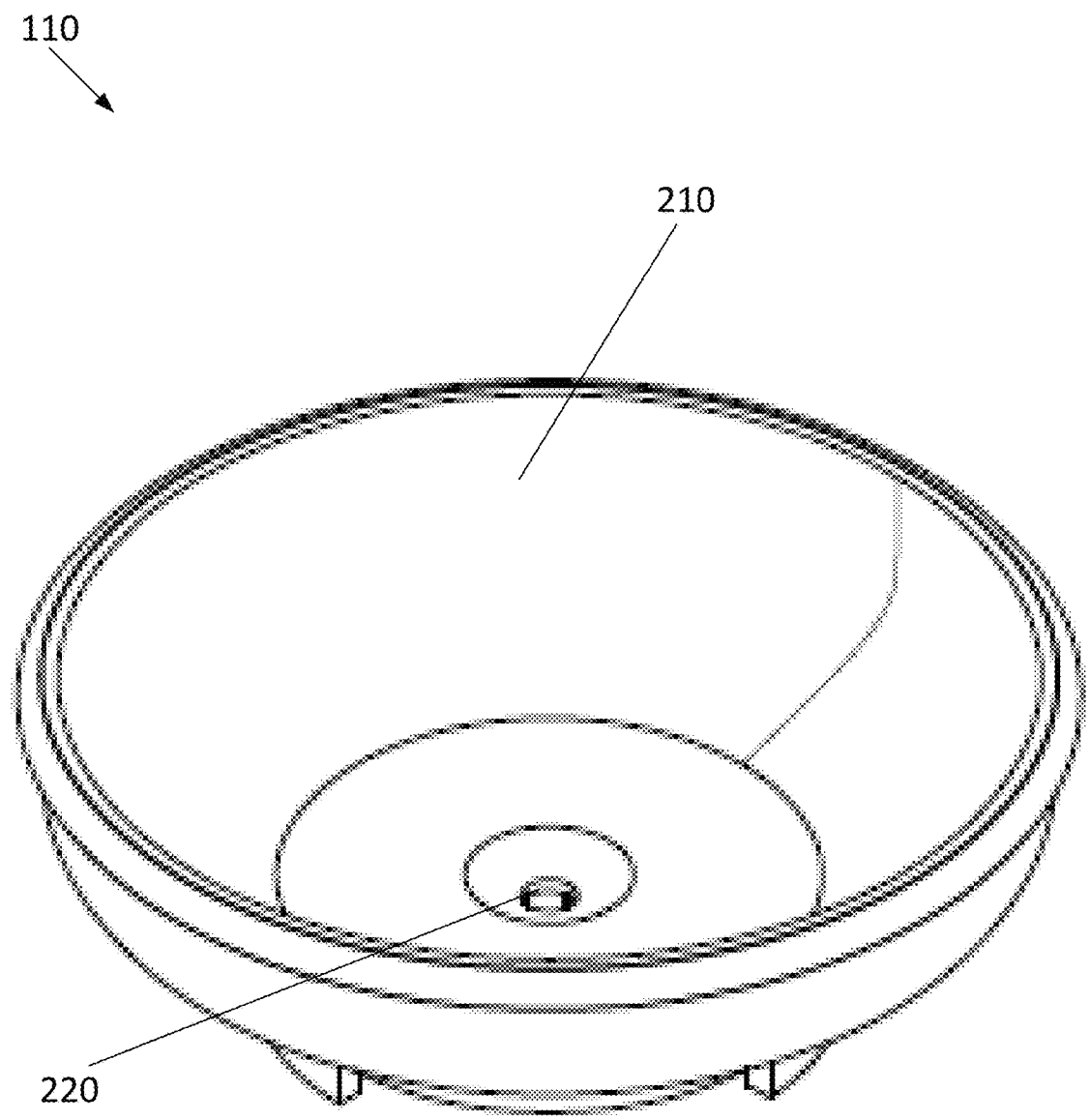
FIG. 2 depicts a top perspective view of a funnel, according to an embodiment.

FIG. 2 depicts a top perspective view of funnel 110, according to an embodiment.

As depicted in FIG. 2, funnel 110 may include conical sidewalls 210 and a first outlet 220. Conical sidewalls 210 may be sloped or angled such that an upper portion of funnel 110 has a wider diameter than a lower portion of funnel 210. Utilizing conical sidewalls 210, funnel 110 may be configured to channel liquid or other substances into first outlet 220. In other embodiments, conical sidewalls 210 may be linear in shape with a downward slope.

First outlet 220 may be centrally located within a trough within conical sidewalls 210. First outlet 210 may be an orifice, opening, hole, etc. extending through a lower surface of funnel 110, such that liquid may exit funnel 110 through first outlet 220.

Figure 3:
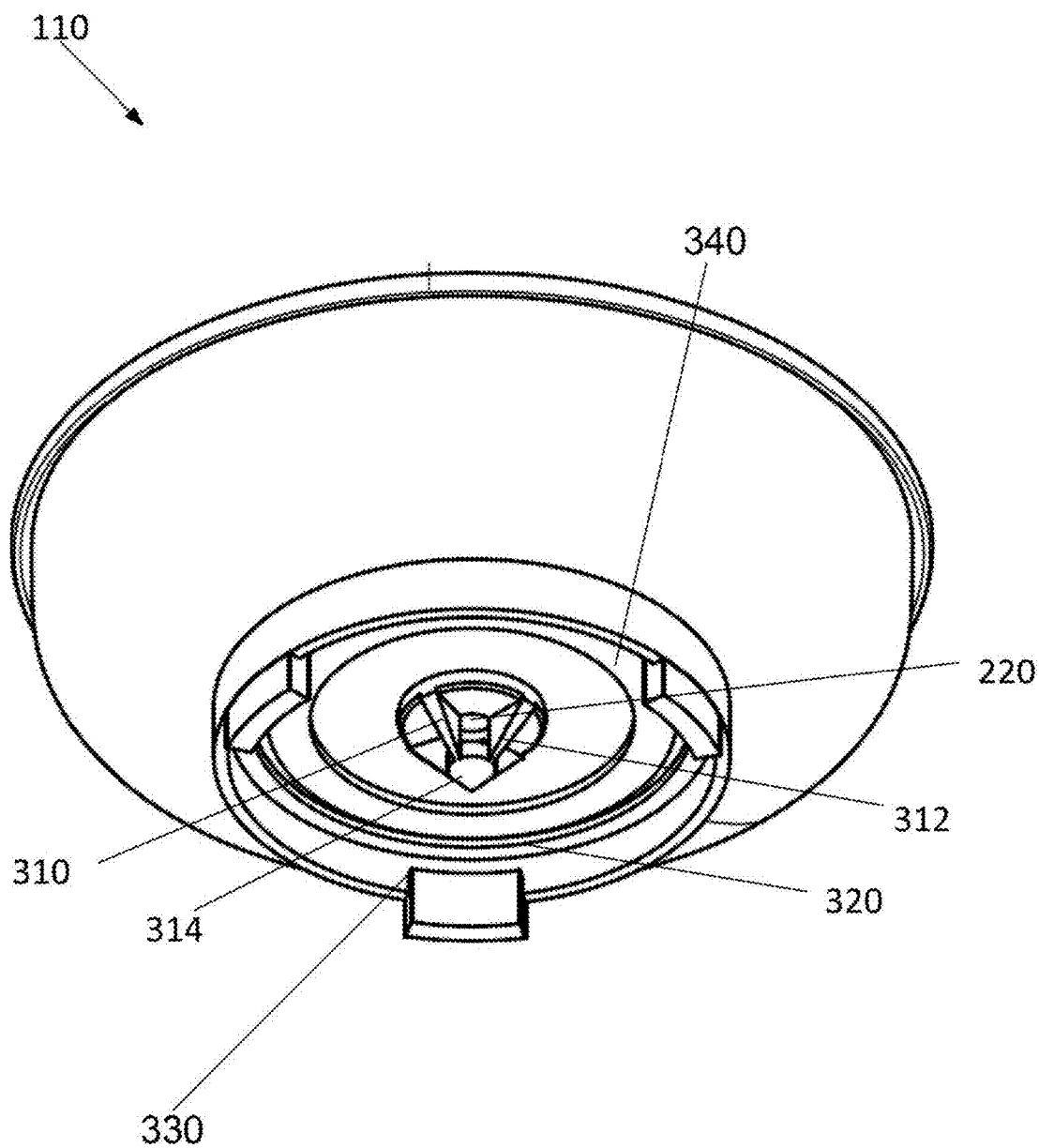
FIG. 3 depicts a bottom perspective view of a funnel, according to an embodiment.

FIG. 3 depicts a bottom perspective view of funnel 110, according to an embodiment. Elements depicted in FIG. 3 may be substantially the same as those described above. For the sake of brevity, a further description of these elements is omitted.

As depicted in FIG. 3, a lower surface of funnel 110 may include first outlet 220, flow separator 310, raised platform 340, threads 330, and O-Ring and seat 320.

Flow separator 310 may include a plurality of fins 312 and cone 314. The plurality of fins 312 may be triangular in shape, and may be spaced equidistance from each other. For example, in an embodiment, each of the fins 312 may be spaced ninety degrees apart from each other. However in other embodiments, the fins 312 may be spaced one hundred and twenty degrees from each other. A first leg of each of the plurality of fins 312 may be positioned adjacent to a circumference of first outlet 220, and the first leg may extend radially away from the circumference of first outlet 220. A second leg of each of the plurality of fins 312 may be positioned adjacent to the circumference of first outlet 220, and the second leg may extend in a downward direction to be adjacent to a surface of cone 314.

Cone 314 may be positioned below each of the plurality of fins 312. Cone 314 may include a tapered surface that tapers smoothly from a flat base to a vertex. The tapered surface of cone 314 may be used to puncture the aluminum foil top of some standard brewing pods. When in use, the flow separator may be configured to prevent flow vortexes within funnel 110, cartridge holder 120, or the filter because flow vertexes may reduce brewing efficiency. By reducing flow vertexes in the filter, brewed liquid positioned in the filter may be more evenly distributed within the filter. This may allow the brewed liquid to not be dispersed against the sidewalls of the filter.

O-Ring Slot 320 may provide for a removable O-ring made of a suitable food grade quality Buna-N 70, silicon or other FDA approved elastic or rubber material. When in use, the cartridge holder 120 may screw into the lower surface funnel 110 pressing against the raised sealing platform 340. The filter 800 or filter lip 810 may be sandwiched between the raised sealing platform 340 and the Filter lip 810 to produce a semi-water tight compression seal. The diameter of the O-Ring fitted in slot 320 may serve as a secondary seal to produce an outer sealing surface area to compensate for different filter lip 810 total diameters.

Threads 330 may be slots, channels, notches, etc. within a lower surface funnel 110. Threads 330 may be configured to receive corresponding threads positioned on an upper surface of cartridge holder 120 to couple cartridge holder 120 with funnel 110. Responsive to turning cartridge holder 120 in a first direction, cartridge holder 120 may be coupled to funnel 110. Responsive to turning cartridge holder 120 in a second direction, cartridge holder 120 may be decoupled from funnel 110. The raised platform threads 330 may serve as a platform to protect the cone 314 while sitting separated or to help align the threads for cartridge holder 120.

Figure 4:
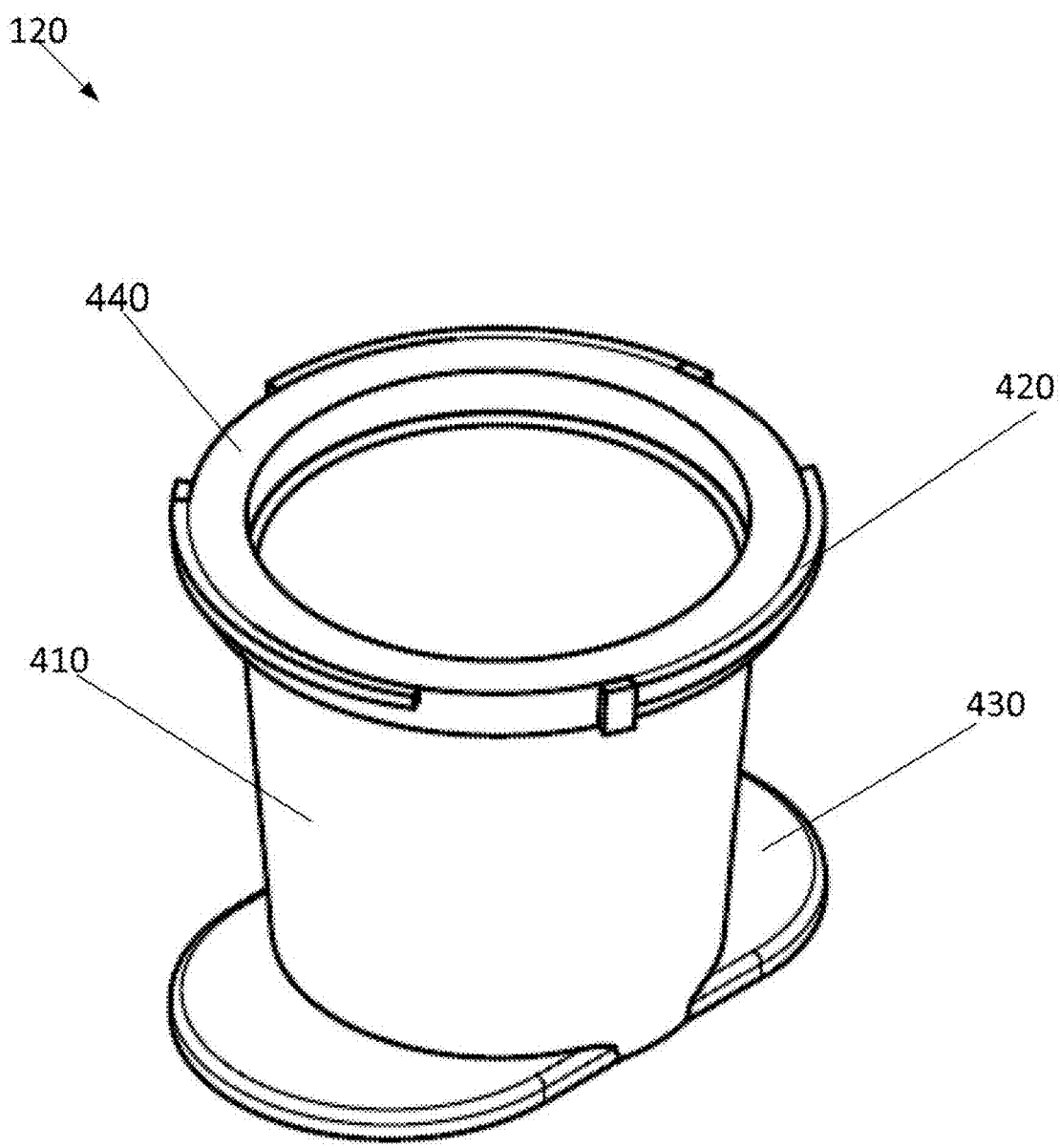
FIG. 4 depicts a top perspective view of a cartridge holder, according to an embodiment.

FIG. 4 depicts a top perspective view of cartridge holder 120, according to an embodiment. Elements depicted in FIG. 4 may be substantially the same as those described above. For the sake of brevity, a further description of these elements is omitted. Cartridge holder 120 may include sidewalls 410, threads 420, and support structure 430.

Cartridge holder 120 may be a device that is configured to be coupled with funnel 110, and receive a filter and/or a brewing pod. The filter or brewing pod may be inserted into cartridge holder 120, such that cartridge holder 120 secure the filter or brewing pod in place. In embodiments, sidewalls 410 may be tapered, wherein the tapering angle and circumference of sidewalls 410, may be greater than that of the sidewalls of the filter and/or brewing pod, which may create a space between sidewalls 410 and the filter and/or brewing pod. In embodiments, cartridge holder 120 may have a height that is greater than the height of the filter or brewing pod, such that when the filter or brewing pod is inserted into the cartridge holder 120 there is a gap between the lower surface of the filter or brewing pod and the lower surface of cartridge holder 120.

Threads 420 may be slots, channels, notches, etc. positioned on an upper surface of cartridge holder 120. Threads 420 may be configured to be inserted corresponding threads 330 positioned on a lower surface of funnel 110

Support structure 430 may be configured to secure system 100 in an upright position. Support structure 430 may be positioned on a lower surface of the cartridge holder 120. Support structure 430 may have an oblong shape. A length of support structure 430 may be shorter or longer than the diameter of the upper surface of cartridge holder 120 to create a foot or base. However, a width of the support structure 430 may be shorter than a diameter of the upper surface of cartridge holder 120.

Figure 5:
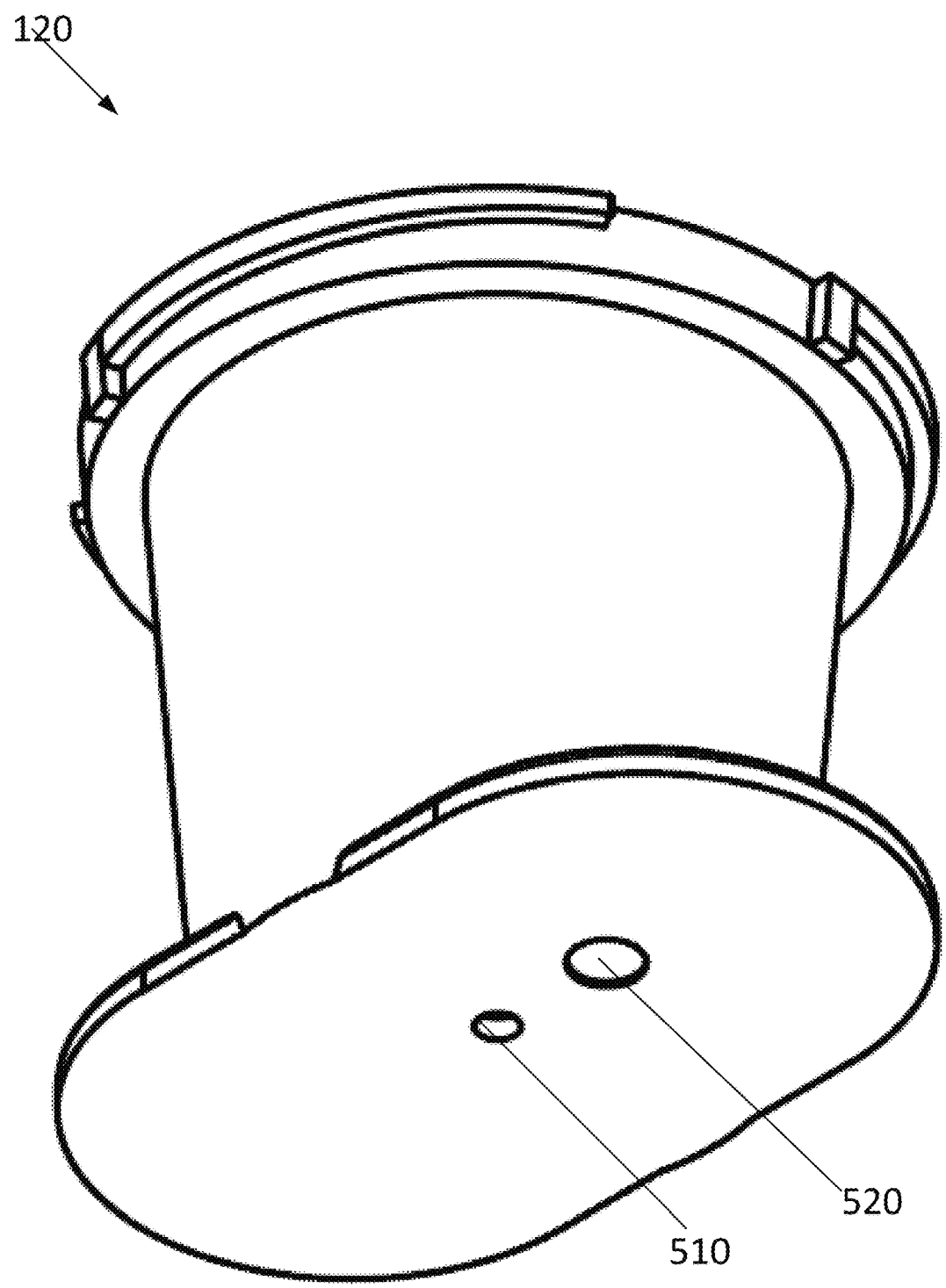
FIG. 5 depicts a bottom perspective view of a cartridge holder, according to an embodiment.

FIG. 5 depicts a bottom perspective view of cartridge holder 120, according to an embodiment. Elements depicted in FIG. 5 may be substantially the same as those described above. For the sake of brevity, a further description of these elements is omitted. Cartridge holder 120 may include a tack 520, or tack hole 520 to screw a removable tack in place, and a second outlet 510.

Tack 520 may be a nail, pin, screw, etc. that is configured to extend into a hollow changer within cartridge holder 120. Responsive to inserting a brewing pod within cartridge holder 120, tack 520 may be configured to extend into the lower surface of the brewing pod to puncture the brewing pod. The design of tack 520 may allow the bottom of a brewing pod to be punctured and for the pod to drain while eliminating the clogging of conventional needle-type tacks.

Second outlet 510 may be an orifice, hole, etc. extending through a lower surface of cartridge holder 120. Responsive to brewed liquid flowing through the filter or brewing pod, the brewed liquid may exit the cartridge holder 120 through second outlet 510.

Figure 6:
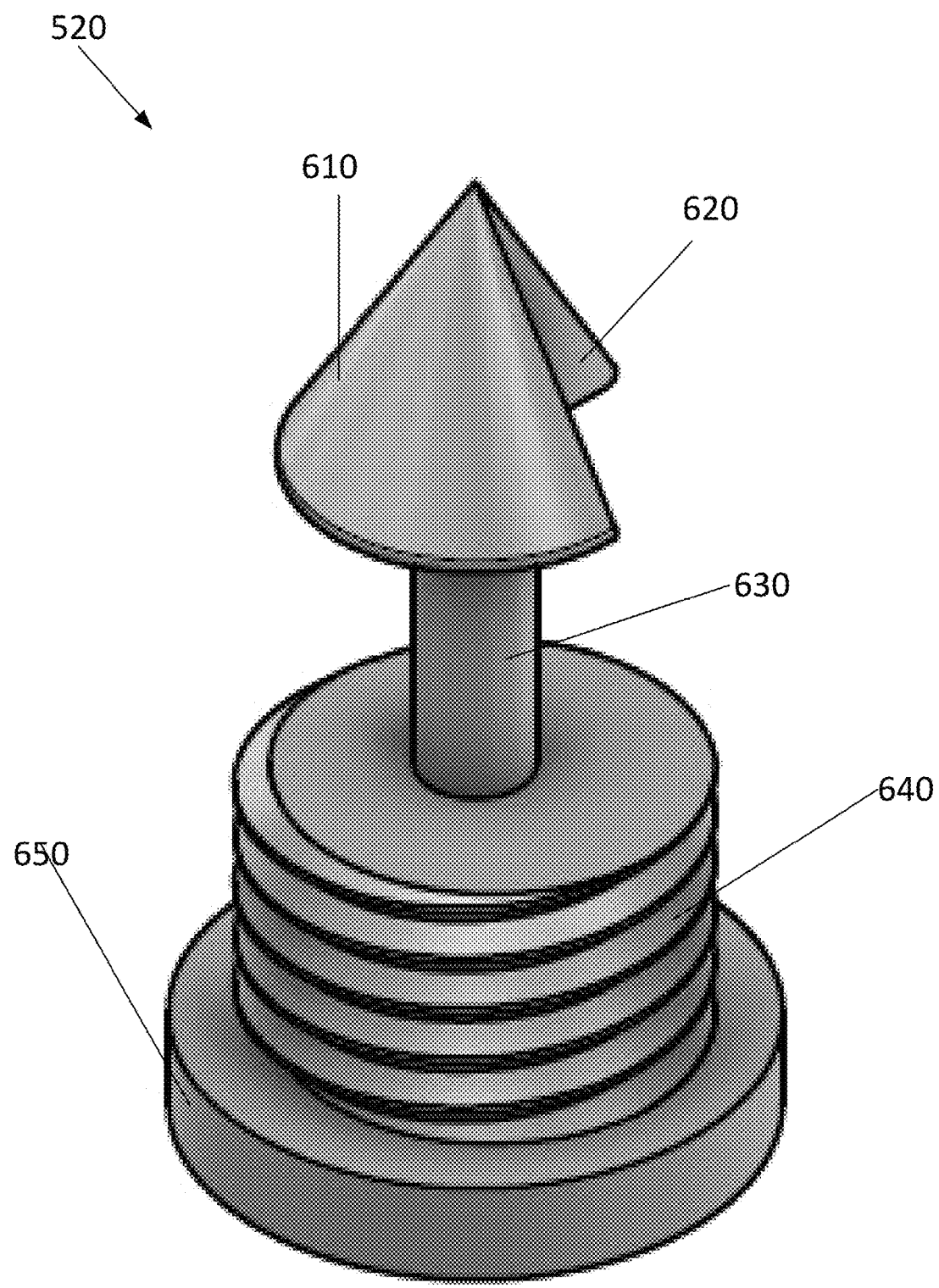
FIG. 6 depicts a top perspective view of a tack, according to an embodiment.

FIG. 6 depicts a top perspective view of tack 520, according to an embodiment. Elements depicted in FIG. 6 may be substantially the same as those described above. For the sake of brevity, a further description of these elements is omitted.

As depicted in FIG. 6, tack 520 may include a conical top 610 with cutout 620, stem 630, threads 640, and base 650.

Conical top 610 may be a three-dimensional geometric shape that tappers smoothly from a flat base to a vertex. The vertex of conical top 610 is configured to pierce through a lower surface of a brewing pod responsive to inserting the brewing pod within cartridge holder 120. When the vertex pierces through the brewing pod, a hole, puncture, opening, etc. may be formed within the lower surface. This may allow brewed liquid to flow through the hole.

Cutout 620 may be a groove, channel, indention, etc. within conical top 610. Cutout 620 may extend around ninety degrees of conical top 610. However, in other embodiments, cutout 620 may extend around other magnitudes, such as one hundred eighty degrees, one hundred twenty degrees, sixty degrees, etc. Cutout 620 may include planar sidewalls that extend downward in a plane that is parallel to a longitudinal axis of tack 520. In embodiments, cutout 620 may allow brewed liquid to exit the brewing pod once tack 520 has pierced through the bottom layer of the brewing pod.

Stem 630 may be a tubular structure that extends from a lower surface of conical top 610 to an upper surface of threads 640. Stem 630 may have a smaller diameter than that of the lower surface of conical top 610, such that when conical top 610 pierces a brewing pod stem 630 does not seal the puncture. Thus, stem 630 will not impede brewed liquid from exiting the hole.

Threads 640 may be a helical structure that is configured to be inserted through a hole within the lower surface of cartridge holder 120 to removably coupled tack 520 to the cartridge holder 120. Responsive to rotating tack 520 in a first direction, threads 640 may secure tack 520 to cartridge holder 120. Responsive to rotating tack 520 in a second direction, threads 640 may decouple tack 520 from cartridge holder 120.

Base 650 may be positioned below threads 640, and may have a wider diameter than that of threads 640. Responsive to coupling tack 520 to cartridge holder 120, base 630 may seal a hole configured to receive tack 520 through the lower surface of cartridge holder 120. Between base 650 and threads 640, a sealing ring or O-ring of suitable food grade elastic or rubber may be used to create a water tight seal between base 650 and cartridge holder 120.

Figure 7:
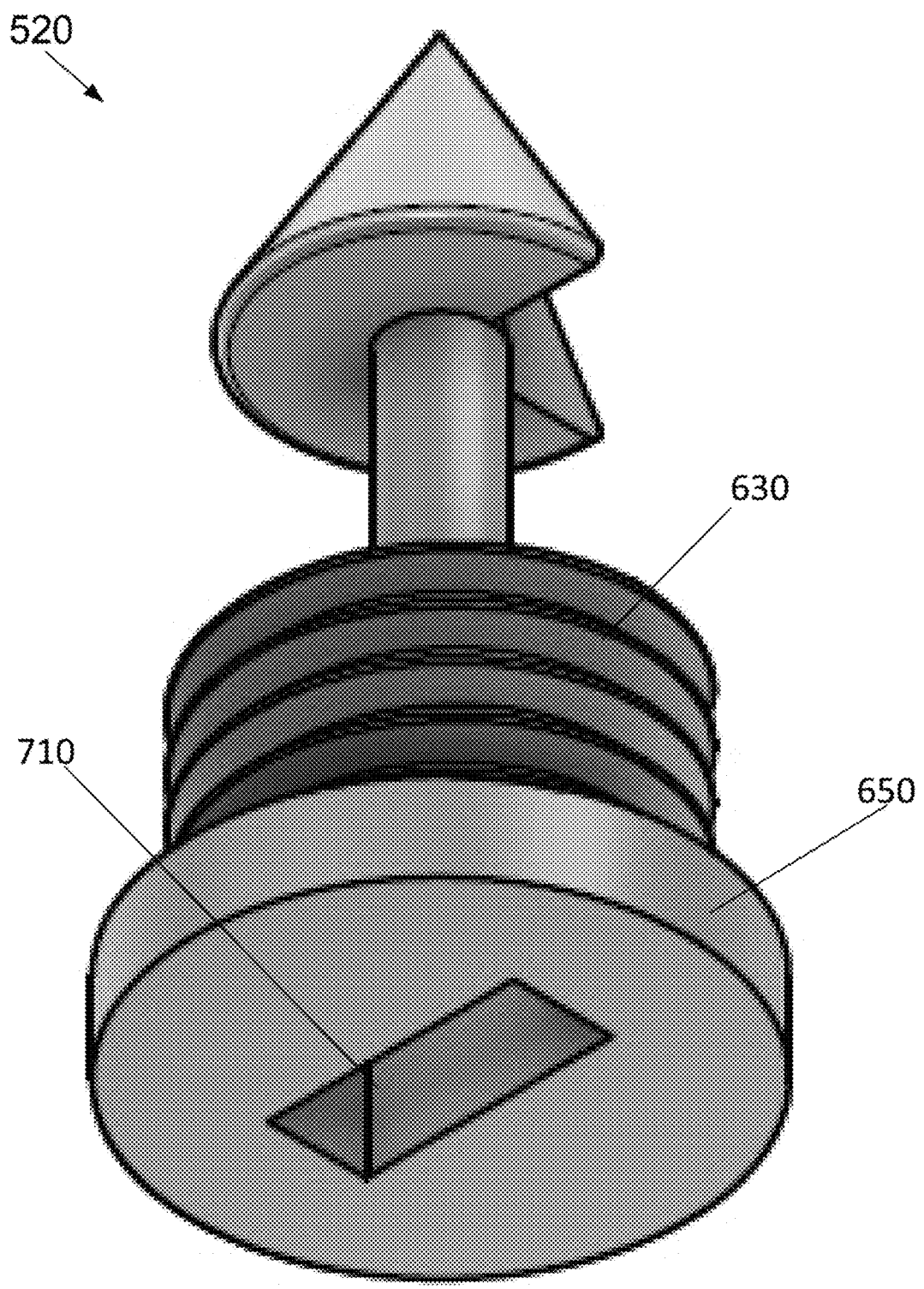
FIG. 7 depicts a lower perspective view of a tack, according to an embodiment.

FIG. 7 depicts a lower perspective view of tack 520, according to an embodiment. Elements depicted in FIG. 7 may be substantially the same as those described above. For the sake of brevity, a further description of these elements is omitted.

As depicted in FIG. 7, base 650 may include a screw driver slot 710. Screw driver slot 710 may be an opening configured to receive a screw driver or other turning mechanism. Screw driver slot 710 may assist in the rotation of threads 630 through or out of the hole within the lower surface of cartridge holder 120.

Figure 8:
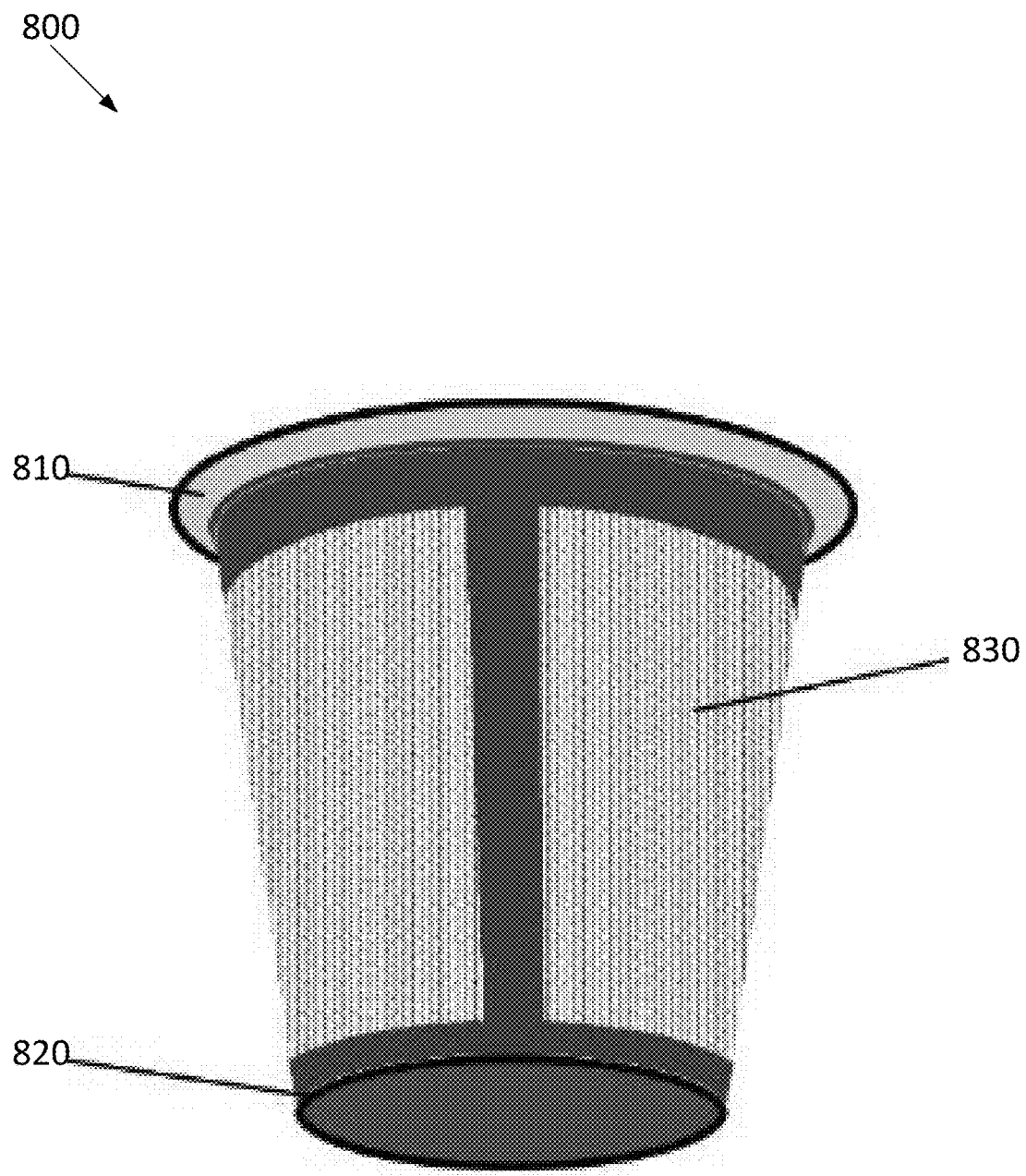
FIG. 8 depicts a lower perspective view of a filter, according to an embodiment.

FIG. 8 depicts a lower perspective view of filter 800, according to an embodiment. Elements depicted in FIG. 8 may be substantially the same as those described above. For the sake of brevity, a further description of these elements is omitted.

Filter 800 may be a device that is configured to hold ground coffee, tea, hot cocoa, soup, or other pre-brewed solids, receive water from the first outlet 220, and filter the ground coffee from the pre-brewed materials. Filter 800 may be configured to provide a concentration space where as a brew time proceeds, the brewed liquid may be housed within filter 800, which may give the brewed liquid more time with the ground pre-brew materials to compensate for dilution. Filter 800 may include a lip 810, basket 820, and screen 830.

Lip 810 may be configured to sit on an upper surface of cartridge holder 120 responsive to placing filter 800 within cartridge holder. In embodiments, lip 810 may have a wider diameter than that of basket 820 and/or screen 830.

Basket 820 may be a support structure that is configured to form the body of filter 800. In embodiments, basket 820 may be formed of a rigid structure, such as plastic. Basket 820 may include windows, wherein fluid may flow out of basket 820 and through screen 830 into the cartridge holder. Furthermore, a lower surface of basket 820 may include a permeable material, which may allow for brewed beverage to exit basket 820 and screen 830 via the lower surface of basket 820. In embodiments, basket 820 may form tapered sidewalls for filter 800. The tapering of sidewalls associated with filter 800 may have a sharper angle and have a smaller total circumference than that of sidewalls 410 of cartridge holder 120. Therefore, there may be a space between the two sidewalls, such that the liquid may exit out of basket 820.

Screen 830 may be a mesh, web, permeable material, etc. that is configured to allows liquid to enter, allow brewed liquid to exit filter 800, while retaining ground coffee or beverage placed within the filter 800. In embodiments, the filter may be a brewing pod or a cup with an open top surface configured to sit within the cartridge holder.

In embodiments, filter 800 may have a height that is less than a distance from the top of tack 520 to the top of cartridge holder 120. Therefore, when filter 800 is placed within cartridge holder 120, tack 520 may not puncture filter 800. However, in embodiments that use a brewing pod as a filter, the brewing pod may have a height that is greater than the distance between the top of tack 520 to the top of cartridge holder 120.

Figure 9:
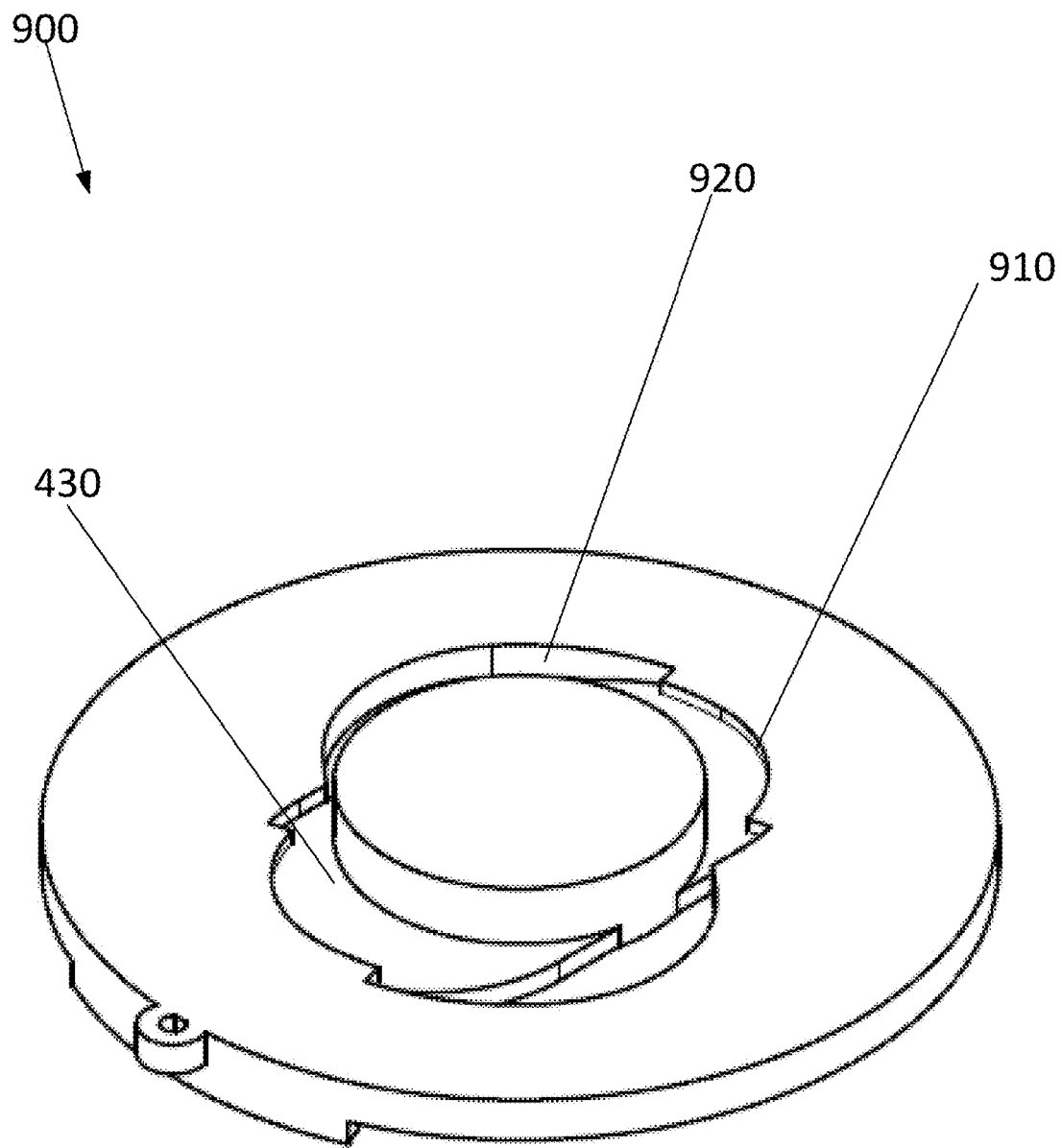
FIG. 9 depicts a top perspective view of a foot device, according to an embodiment.

FIG. 9 depicts a top perspective view of foot device 900, according to an embodiment. Elements depicted in FIG. 9 may be substantially the same as those described above. For the sake of brevity, a further description of these elements is omitted.

Foot device 900 may be cylindrical in shape, and may be configured to be positioned over a cup, coffee mug, etc. Utilizing foot device 900, a user may brew a single cup of coffee or beverage without a conventional coffee maker. Foot device 900 may be configured to temporarily secure system 100 in place by inserting system 100 within foot device 900 and rotating system 100 to lock system 100 in place. To decouple system 100 from foot device 900, system 100 may be rotated in the reverse direction.

Foot device 900 may include a first opening 920 and a second opening 910. First opening 920 may be configured to extend across a first diameter of foot device 900, and have a shape that substantially corresponds with the shape of support structure 430. Additionally, support structure 430 may be configured to be inserted into first opening to be embedded into foot device 900.

Second opening 910 may be configured to extend across a second diameter of foot device 900. Second opening 910 may be shorter than first opening 920, such that if support structure 430 is turned to align with the second opening 910 the ends of support structure 430 will extend past the ends of second opening 910. Therefore, when support structure 430 is aligned with second opening 910, support structure 430 may be secured within foot device 900. The lip of the second opening 910 may be of such a thickness that it grasps the outer end of support structure 430 holding it firmly in place.

Figure 10:
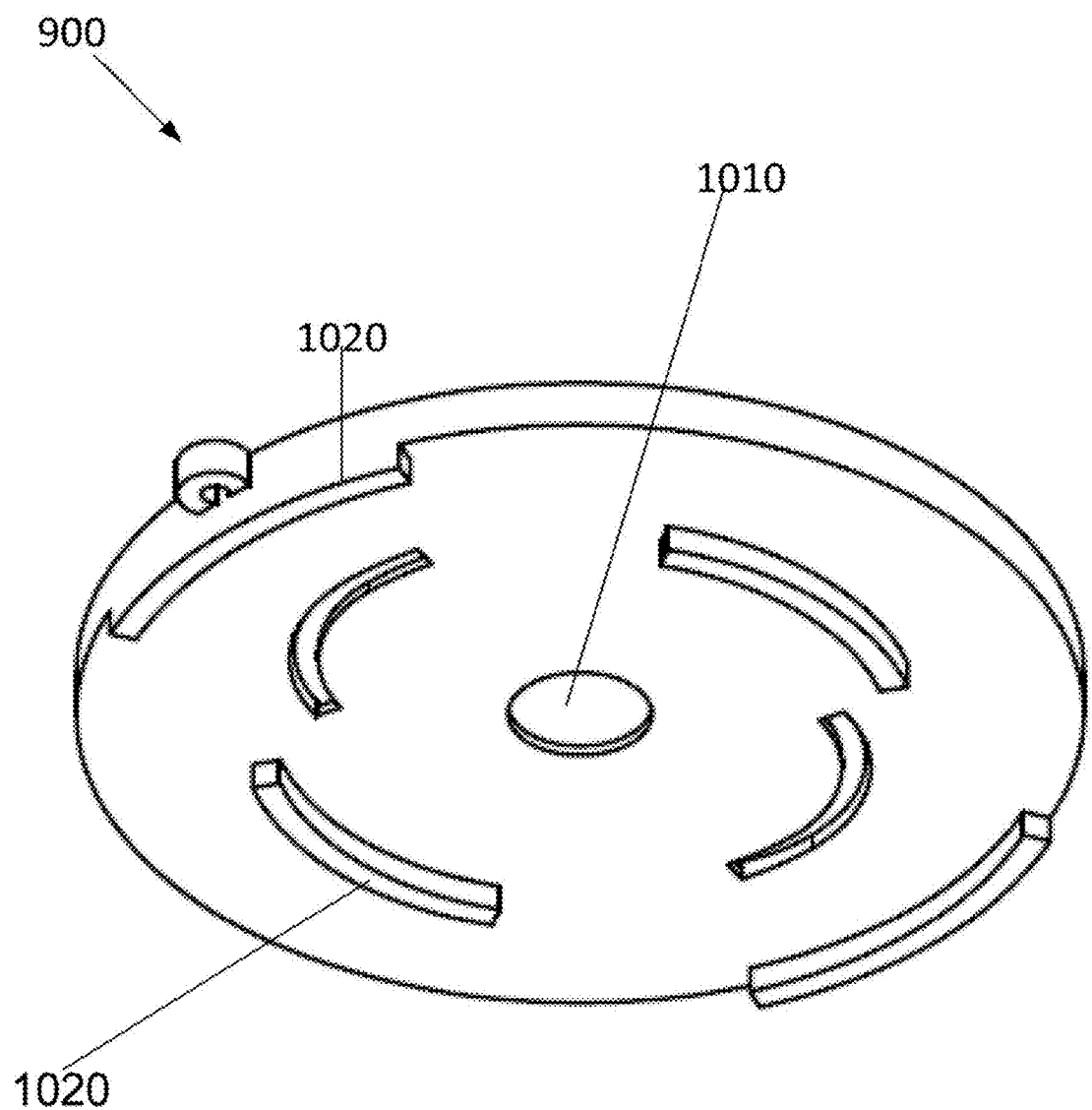
FIG. 10 depicts a bottom perspective view of a foot device, according to an embodiment.

FIG. 10 depicts a bottom perspective view of foot device 900, according to an embodiment. Elements depicted in FIG. 10 may be substantially the same as those described above. For the sake of brevity, a further description of these elements is omitted.

As depicted in FIG. 10, a lower surface of foot device 900 may include an orifice 1010, wherein brewed liquid may flow through the orifice into a cup or coffee mug.

Furthermore, foot device 900 may include ledges 1020. Ledges 1020 may be projections, brackets, etc. extending in a direction perpendicular to the diameter of foot device 900. Ledges 1020 may configured to be inserted around the sidewalls of a cup or coffee mug to temporarily couple foot device more securely with the cup or coffee mug.

Figure 11:
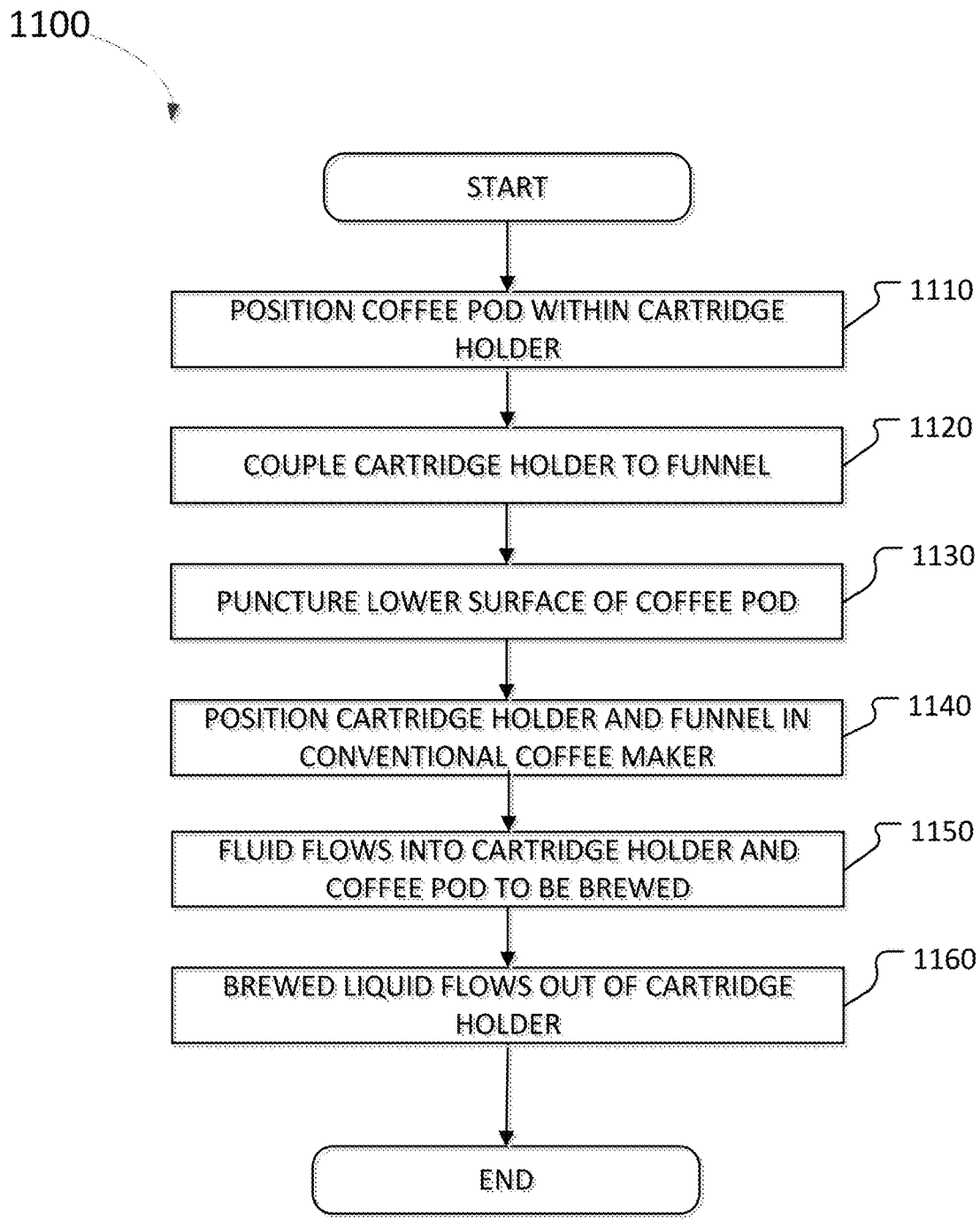
FIG. 11 depicts a method for utilizing a brewing system, according to an embodiment.

FIG. 11 depicts a method 1100 for utilizing a brewing system. The operations of method 1100 presented below are intended to be illustrative. In some embodiments, method 1100 may be accomplished with one or more additional operations not described, and/or without one or more of the operations discussed. Additionally, the order in which the operations of method 600 are illustrated in FIG. 11 and described below is not intended to be limiting.

At operation 1110, a brewing pod may be positioned within a cartridge holder. The brewing pod may be a single serving pod with coffee grinds or other brewing substrate positioned within the pod. A Basket 800 may be positioned within the cartridge holder in place of the brewing pod.

At operation 1120, the cartridge holder may be coupled to a funnel.

At operation 1130, due to forces created by coupling the cartridge holder and the funnel, the brewing pod may slide towards a lower surface of the cartridge holder. This may cause a tack positioned on a lower surface of the cartridge to pierce through a lower surface of the brewing pod creating an opening.

At operation 1140, the cartridge holder and the funnel may be positioned within a conventional coffee maker, and the conventional coffee maker may dispense water onto the funnel.

At operation 1150, the water may flow through the funnel and flow diverter, and into the cartridge holder and brewing pod, where the beverage may be brewed and then exit out at a controlled rate.

At operation 1160, the brewed beverage may flow out of the cartridge holder and into a cup or coffee mug.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases in "one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A system to brew a predetermined amount of liquid comprising:
    a funnel with conical sidewalls with a first outlet;
    a cartridge holder being configured to be removable coupled with the funnel, the cartridge holder being configured to receive liquid from the first outlet, the cartridge holder including a support structure positioned on a lower end of the cartridge holder, the support structure having a second outlet and an oblong shape, the support structure securing the system in an upright position, wherein a bottom length of the support structure is longer than a diameter of an upper surface of the cartridge holder, the bottom length of the support structure is shorter than a diameter of an upper surface of the funnel, and a bottom width of the support structure is shorter than the diameter of the upper surface of the cartridge holder, and the bottom width is shorter than the bottom length, wherein the support structure is positioned below the cartridge holder;
    a tack positioned on the support structure, the tack being configured to extend into a lower surface of a hollow body of the cartridge holder, the tack being configured to puncture a brewing pod positioned within the cartridge holder, the tack including a stem and a conical top, a first circumference of the stem being less than a second circumference of a base of the conical top, wherein the conical top includes a cutout extending around ninety degrees of the conical top from an apex of the conical top to the base, the base being positioned adjacent to the stem, the tack being misaligned with a center of the support structure.

2. The system of claim 1, further comprising:
a raised sealing surface positioned at a bottom of the funnel such that when the cartridge holder comes into contact with the raised surface, a seal is formed.

3. The system of claim 1, further comprising:
a flow separator positioned below the first outlet and within the cartridge holder when the cartridge holder is coupled to the funnel, the flow separator being configured to reduce flow vertexes in a filter positioned within the cartridge holder.

4. The system of claim 3, wherein the flow separator includes a plurality of fins that are positioned equidistance apart from each other.

5. The system of claim 1, wherein the brewing pod is configured to be positioned within the cartridge holder.

6. The system of claim 5, wherein a distance between a lower surface of the brewing pod and the lower surface of the cartridge holder is shorter than a length of the stem.

7. The system of claim 1, further comprising:
a filter configured to store coffee grinds, the filter including a mesh screen and first tapered sidewalls, the filter being configured to be positioned within the cartridge holder.

8. The system of claim 7, wherein the cartridge holder includes second tapered sidewalls, a first angle of the first tapered sidewalls being greater than a second angle of the second tapered sidewalls.

9. The system of claim 1, further comprising:
a foot device being configured to be removably coupled with the support structure.

10. The system of claim 9, wherein an upper surface of the foot device includes a first opening and a second opening, the first opening having a first length that is longer than that of the bottom length of the support structure, the second opening having a second length that is shorter than that of the bottom length.

11. The system of claim 10, wherein the support structure is configured to rotate in a first direction while aligned with the first opening to couple the foot device and the support structure together, wherein responsive to rotating the support structure in the first direction the bottom length of the support structure is positioned below the second opening.

12. The system of claim 11, wherein the support structure is configured to rotate in a second direction while aligned with the second opening to decouple the foot device and the support structure.

* * * * *